DIGITAL DEMODULATOR FOR FREQUENCY SHIFT KEYING SYSTEMS

Filed Oct. 13, 1967 3 Sheets-Sheet 1

INVENTOR
WILLIAM G. CROUSE
BY John C Black
ATTORNEY

2

DIGITAL DEMODULATOR FOR FREQUENCY SHIFT KEYING SYSTEMS

Filed Oct. 13, 1967 3 Sheets-Sheet 3

United States Patent Office 3,559,083

Patented Jan. 26, 1971

3,559,083

DIGITAL DEMODULATOR FOR FREQUENCY SHIFT KEYING SYSTEMS

William G. Crouse, Raleigh, N.C., assignor to International Business Machines Corporation, Armonk, N.Y., a corporation of New York Filed Oct. 13, 1967, Ser. No. 675,244
Int. Cl. H04l 27/14
U.S. Cl. 329—104 9 Claims

ABSTRACT OF THE DISCLOSURE

Digital logic devices respond to incoming transmission signals in a frequency shift keying system and determine the frequency of each half cycle of the incoming signal. Consequently, a maximum data transmission rate can be achieved with each half cycle of the carrier representing a bit of information. Monostable devices respond to each change in amplitude of the incoming signal and control a sampling circuit to identify the incoming signal frequency.

BACKGROUND OF THE INVENTION

In the transmission of digital signals, it is well known to modulate a carrier wave by altering its frequency between two or more discrete frequencies in accordance with the information to be transmitted. Irrespective of the method of digital signal coding employed, transmission of the carrier wave at one discrete frequency, *fm*, may be referred to as the mark frequency and transmission of the carrier wave on another discrete frequency, *fs*, may be referred to as the space frequency. Thus, in transmission, the carrier wave is transmitted at one or the other of the frequencies *fm* or *fs* depending upon whether a mark or a space is being transmitted.

In demodulating a received frequency shift modulated wave, conventional prior art apparatus employed frequency selective filters, one of which was tuned to each of the frequencies to be transmitted. In order to provide a high signal to noise ratio in the overall system, it is desirable to reduce the bandwidth to which the filters are capable of responding. Accordingly, highly selective filters are employed. However, with highly selective filters, the rise time of the filter is relatively long. That is, with a tuned circuit, several cycles of the incoming wave are required to cause the filter to provide a given output signal. This means, that in a frequency shift modulated wave, the amount of information to be transmitted in a given time interval is restricted by the selectivity of the filters employed in the demodulator.

In the event that the amount of information to be transmitted is increased beyond the rise time capability of the tuned filters at the receiver demodulator, signal information is lost due to a failure of the filters to respond and provide output signals during each of the relatively short intervals in which a particular one of the two discrete frequencies may be transmitted. On the other hand, the selectivity of the filters may be reduced in conventional prior art systems to accommodate a higher rate of information transfer, but with an attendant deterioration in the signal to noise ratio of the overall system due to the fact that a decrease in selectivity of the filters increases the bandwidth within which spurious signals are received.

In U.S. Pat. No. 3,233,181, issued Feb. 1, 1966 to R. W. Calfee for "Frequency Shift Signal Demodulator" there is shown and described a demodulator utilizing digital techniques for the derivation of the information from a frequency shift modulated wave. As stated in the patent, it is analogous to an ideal filter arrangement in that its response is unity inside its pass band and substantially zero outside its pass band. In said patent, the incoming carrier signals are applied to a bandpass filter and amplifier limiter to produce bivalued signals representative of data. Voltage transitions in said bivalued signals of one polarity initiate a timing network, and voltage transitions of the opposite polarity sample the timing network to determine the period between the consecutive transitions. The patented structure reliably detects data represented by one or more complete cycles of the carrier frequency.

CROSS-REFERENCES TO RELATED APPLICATIONS

In a copending application of W. G. Crouse, Ser. No. 448,521, filed Apr. 15, 1965 entitled "Data Transmission Apparatus Utilizing Frequency Shift Keying," now U.S. Pat. No. 3,432,616 issued Mar. 11, 1969, there is described a system of the type in which the present improvement can be utilized and said application is incorporated herein by reference as if set forth in its entirety. In particular, the transmitter of said application is well adapted for use with the demodulator of the present application.

SUMMARY OF THE INVENTION

The improved digital demodulator of the present application permits significantly higher maximum information transfer rates wherein each half cycle of the carrier may represent a bit of data. In addition, since the improved demodulator has the capability of determining the frequency of each half cycle, it assures greater reliability even where a lower information transfer rate is utilized since it is less likely to fail to detect significantly distorted carrier signals. For example, if it be assumed that at least one full cycle of carrier is transmitted for each bit of data, one can statistically expect that over a period of time there will be several instances in which only a half cycle of the signal transmitted will be received by the associated receiver. The improved apparatus will assure reliable detection of this half cycle, whereas in known apparatus this cannot be definitely assured.

Accordingly, it is a primary object of the present invention to provide an improved digital demodulator in frequency shift keying systems which reliably determines the frequency of each half cycle of an incoming carrier signal.

In one embodiment, a sample signal is produced at a predetermined instant in time following each positive and each negative transient in the output signal of a conventional amplifier limiter which receives the incoming carrier signals. This time interval between the transient and the sample pulse is greater than the half cycle period of the higher frequency and less than the half cycle period of the lower carrier frequency. These pulses sample the polarity of the limiter output signals. If the polarity of the limiter output signal has not changed during the period from the voltage transient and its corresponding sample pulse, the lower frequency has been detected. If the polarity of the limiter output signal has changed during the period between the voltage transient and the initiation of its respective sample pulse, the higher frequency has been detected. Since each voltage transient produces a sample pulse, each half cycle of the limiter output signal is checked for its frequency.

In a second preferred embodiment, each voltage transient initiates first and second consecutive timing pulses. The sum of the periods of the timing pulses is less than the half cycle time of the lower frequency and greater than the half cycle time of the higher frequency. Also, the period of the first timing pulse is less than the half cycle time of the higher frequency. Each voltage transient of the limiter output then samples the condition of the latter timing pulse to determine whether or not it has terminated, and if it has not terminated, to force it to termination. If the second timing pulse has terminated, the lower frequency has been detected; and if it has not terminated, the higher frequency has been detected. Thus, the frequency of each half cycle is reliably determined.

BRIEF DESCRIPTION OF THE DRAWINGS

The foregoing and other objects, features and advantages of the invention will be apparent from the following more particular description of preferred embodiments of the invention, as illustrated in the accompanying drawings.

In the drawings:

In FIG. 1, a data source 1 produces bivalued binary output signals representative of data which it is desired to transmit. These bivalued signals are applied to an oscillator means 2 which produces output carrier signals at one frequency $f1$ or a second frequency $f2$ in response to the output level of the source 1 being at one or the other of said bivalued levels. The output of the oscillator means is applied to an amplifier limiter circuit 3 by way of a suitable transmission line 4. The output of the amplifier limiter is applied to a delay generator 5 and to a sample circuit 6. Outputs S1 and S2 of the delay generator are also applied to the sample circuit. Outputs from the sample circuit are applied to a bistable device 7, the output level of which represents the binary "1" or "0" value of the received data.

Figure 1:
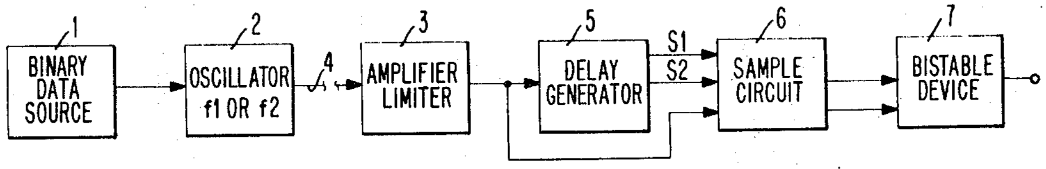
FIG. 1 diagrammatically illustrates one preferred embodiment of the improved digital demodulator.
Figure 2:
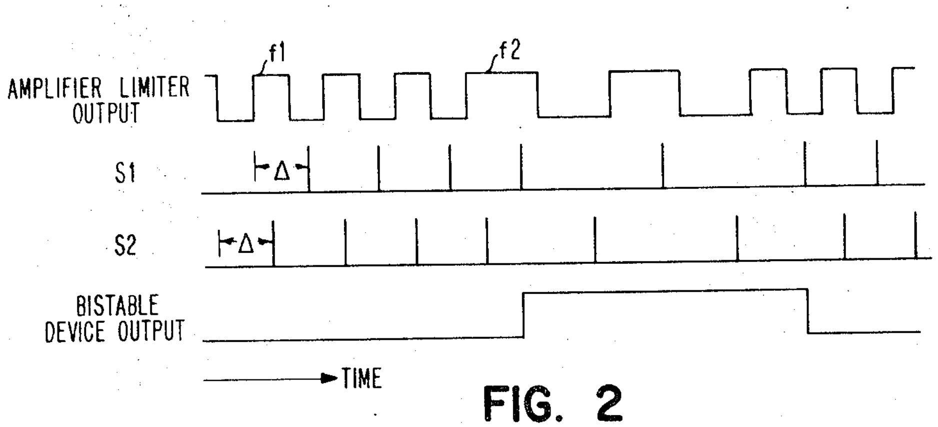
FIG. 2 shows waveforms illustrating the opeartion of the embodiment of FIG. 1.

Attention is directed to FIG. 2 which illustrates the operation of the embodiment of FIG. 1. The output of the oscillator means 2 is in the form of sine wave signals at one or the other of two frequencies $f1$ and $f2$. For the purposes of the description herein, it will be assumed that these signals are received by the amplifier limiter 3 undistorted. The amplifier limiter, which may be any one of several devices well known in the art, produces a square wave output corresponding in frequency to the incoming sine wave signals, these square wave signals being illustrated in FIG. 2. For ease of illustration, the higher frequency signal in FIG. 2 is illustrated as being twice the frequency of the lower frequency signal. Each change in the square wave from a relatively negative to a relatively positive level (hereinafter referred to as a positive transient) and each change in the square wave signal from a relatively positive to a relatively negative value (hereinafter called a negative transient) corresponds to the portions of the incoming sine wave signals which are respectively positive-going and negative-going portions of the same sine wave. One cycle of the incoming sine wave signal corresponds to one cycle of the square wave signal.

It is the function of the delay generator 5 to produce a train of sample pulses S1, each pulse occurring at a predetermined time interval Δ after each positive transient in the amplifier limiter output. It is also a function of the delay generator to produce a train of pulses S2, each of which occurs a predetermined time interval Δ after a corresponding negative-going transient in the amplifier limiter output. The value of these Δ's will be discussed more fully below.

In the sample circuit 6, each signal in the train S1 samples the amplifier limiter output. If the output is negative at this time, the high frequency carrier has been detected; and if the amplifier limiter output is positive, the low frequency carrier has been detected.

In a similar manner, each sample pulse in the train S2 samples the amplifier limiter output. If the output is positive, the high frequency has been detected; and if it is negative, the low frequency carrier has been detected. The sample circuit 6 controls the state of the bistable device 7 in accordance with the sampling results as seen in FIG. 2 to produce an output signal at one or the other of two voltage levels. One voltage represents a logical "1" data condition and the other level represents a logical "0" data condition.

It will be appreciated that FIG. 1 operates reliably as illustrated in FIG. 2 at different data transfer rates. That is, a logical bit may be represented by one or more cycles of $f1$ or $f2$.

The time intervals Δ for S1 and S2 need not necessarily be equal, but they are preferably made equal. In each instance, the Δ must be shorter than the half cycle period of $f1$ and longer than the half cycle period of $f2$. Preferably, they are dimensioned in accordance with the following formula:

$$\Delta = 1/4f1 + 1/4f2$$

In the typical environment of use, $f1$ and $f2$ are represented in cycles per second and Δ in seconds. A typical frequency of operation of $f1$ can be in the order of 1200 cycles per second and $f2$ in the order of 2400 cycles per second. With these frequencies it is possible to transmit at a maximum rate of 2400 bits per second with each half cycle of the carrier representing a data bit.

The implementation illustrated in FIG. 3 will now be described in detail. Output signals from the amplifier-limiter 3 of FIG. 1 are applied to an input terminal D in FIG. 3. These signals are applied to a differential amplifier 10 which produces in-phase output signals on line 11 and out-of-phase output signals on line 12.

The signals on line 11 are applied to the input of a monostable multivibrator 13. The multivibrator 13 includes first and second transistors 14 and 15. The output of the transistor 14 is coupled to the base input of the transistor 15 by way of a coupling capacitor 16. The output of the transistor 15 is coupled to the base input of the transistor 14 by way of resistor 17. The transistor 14 is normally biased to its OFF condition by means including a bias resistor 18. The transistor 15 is normally biased to its ON state by means including a bias resistor 19.

Each negative-going transient on the output line 11 of the differential amplifier 10 turns the transistor 14 ON. This turns the transistor 15 OFF. The transistor 15 remains OFF during the RC time constant of the multivibrator (i.e. Δ), after which the base of the transistor 15 goes slightly negative and again turns ON. Its output goes positive to turn the transistor 14 OFF, and the multivibrator 13 is in its initial stable state. The collector resistor 20 of the transistor 15 provides feedback from the transistor 15 to maintain the transistor 14 in saturation until the delay period Δ is complete.

Figure 4:
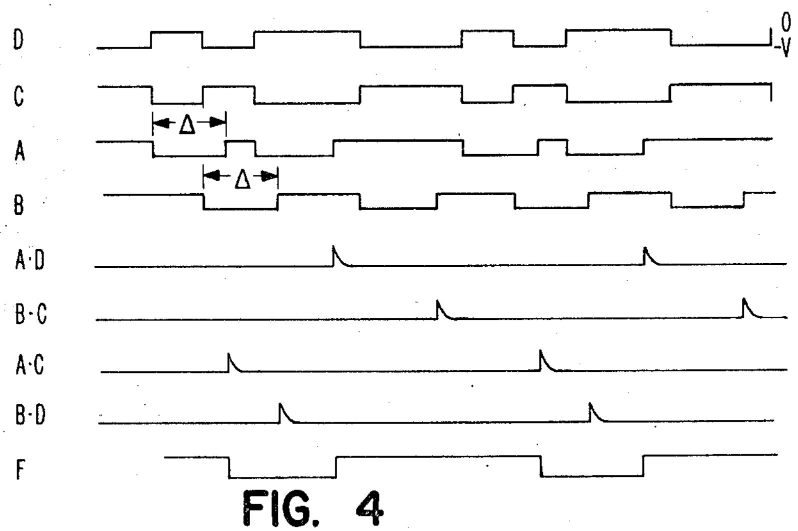
FIG. 4 shows waveforms illustrating the operation of the embodiment of FIG. 3.

FIG. 4 illustrates the positive and negative transients in the input signals at the terminal D. Since the signal on the output line 11 is in phase with the signals appearing at the terminal D, it will have a negative transient each time that a negative transient occurs at the terminal D.

The output line 12 of the differential amplifier 10 is connected to the input of a monostable multivibrator 25 which is identical in construction to the multivibrator 13. Since signals on the output line 12 are out-of-phase with respect to input signals at the terminal D, the multivibrator 25 will be switched from its stable to its unstable condition each time that a positive-going transient appears at the input terminal D. The outputs of the multivibrators are shown at A and B, and the waveforms produced at these terminals are illustrated in FIG. 4. It will be seen that a positive-going transient appears at the terminal A a predetermined time interval Δ after each positive transient appearing at the terminal D. A positive-going transient appears at the output terminal B a predetermined time interval Δ after each negative transient appearing at the input terminal D. It is these positive transients at the terminals A and B which are utilized to sample the amplifier limiter output signals appearing at the terminal D.

The multivibrators 13 and 25 correspond to the delay generator 5 of FIG. 1. The sample circuit 6 of FIG. 1 has been implemented by four Harpur gates 30, 31, 32 and 33 in FIG. 3. The gates are identical and include capacitors 34, 35, 36 and 37; resistors 38, 39, 40 and 41 and diodes 42, 43, 44 and 45.

The Harpur gate is a well-known circuit in which a positive-going output pulse will be produced at the output of the diode, for example, 42, if a positive-going pulse is applied to the input of the capacitor 34 subsequent to a suitable positive potential being applied to the other plate of the capacitor 34 by way of the resistor 38. The diode 42 will block positive pulses applied to the input of the capacitor 34 if the input to the resistor 38 is at its relatively negative level. The relatively positive level of the resistor 38 is insufficient by itself to forward bias the diode 42.

In order for the positive transient sample pulses appearing at the terminal A to sample the input signals at D, it is necessary to produce true and complement signals for the input signals at D. Thus, the terminal D is coupled to a conventional transistor inverter 50 which produces at its output terminal C signals which are the complement of the signals at D.

With reference to FIG. 4, it will be seen that when a positive transient appears at the terminal A, a positive output pulse will be produced at the output of the gate 30, if the input signal at D is positive, or alternatively, will produce a pulse at the output of the gate 33 if the output level of the terminal C is positive. Thus, each positive transient at the terminal A produces an output pulse alternatively at one gate or another depending upon the frequency of the signal which initiated the firing of its associated multivibrator.

Similarly, each positive transient at the terminal B produces an output pulse alternatively at the output of the gate 32 or the gate 31 incident to the level at D or C being positive.

The output terminals of gates 30, 31, 32 and 33 have been labeled A·D, B·C, B·D, and A·C, respectively and waveforms appearing at these terminals are illustrated in FIG. 4. These labels indicate the signal conditions required to produce an output. For example, to produce an output signal at terminal A·D, the signal level at input terminal D must be positive when the signal level at terminal A goes from its negative to its positive level.

Figure 3:
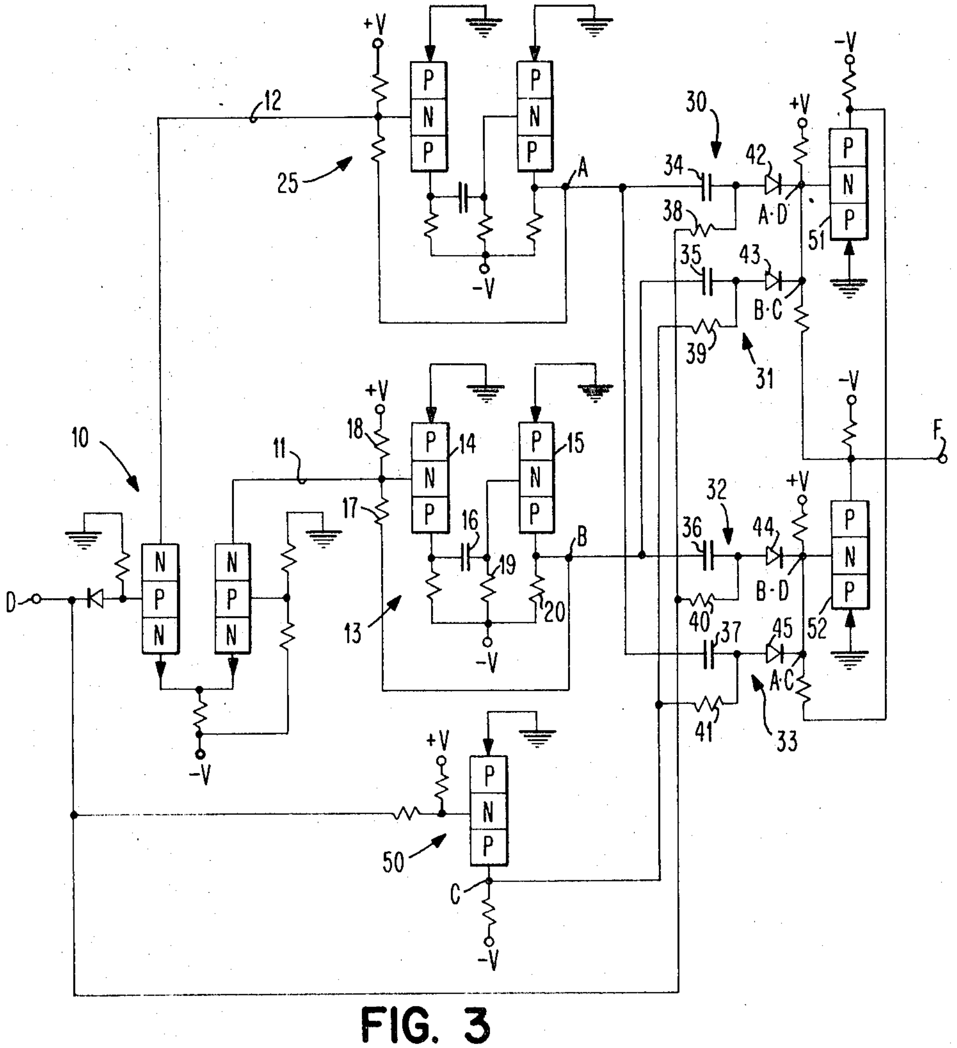
FIG. 3 is a schematic diagram illustrating one implementation of the demodulator diagrammatically illustrated in FIG. 1.

The bistable device 7 of FIG. 1 is implemented in FIG. 3 by means of a pair of suitably cross-coupled transistor inverters 51 and 52. In each stable state, only one of the two transistors 51 and 52 is in its ON state; and the other transistor is in its OFF state. Positive pulses appearing at the output of either gate 30 or 31 will cause the transistor 51 to turn OFF if it is conducting. Turn-off of the transistor 51 will cause the transistor 52 to turn ON. Similarly, positive output pulses at either gate 32 or 33 will cause the transistor 52 to turn OFF if it is conducting. Turn-off of the transistor 52 will cause the transistor 51 to conduct. Bivalued output signals are derived at the collector electrode of the transistor 52 applied to the terminal F.

It can be seen that, in the embodiment of FIG. 3, data can be detected reliably within less than one cycle time of the low frequency. It is, therefore, feasible to transmit only one cycle of each frequency for each data bit.

In those data transmission systems wherein a local oscillator at a receiver is utilized to determine the time for sampling a received data bit, a fixed data bit transmission rate is required, e.g. the rate of the lower of the two frequencies. In the embodiment of FIG. 3, the data bit interval can be set equal to or greater than one-half the cycle time of the lower frequency. If the maximum data rate is utilized, a full cycle of the higher frequency or a half cycle of the lower frequency will be transmitted for each data bit in an environment in which the lower frequency is equal to one-half the higher frequency.

Figure 5:
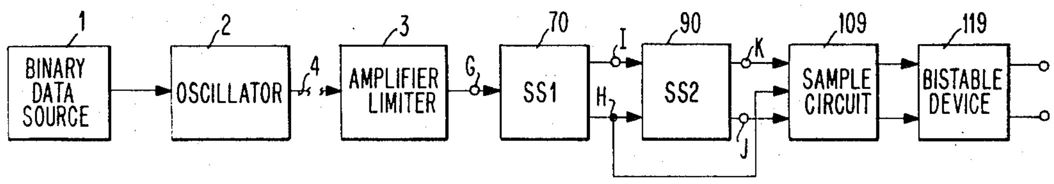
FIG. 5 diagrammatically illustrates a second embodiment of the improved digital demodulator.
Figure 6:
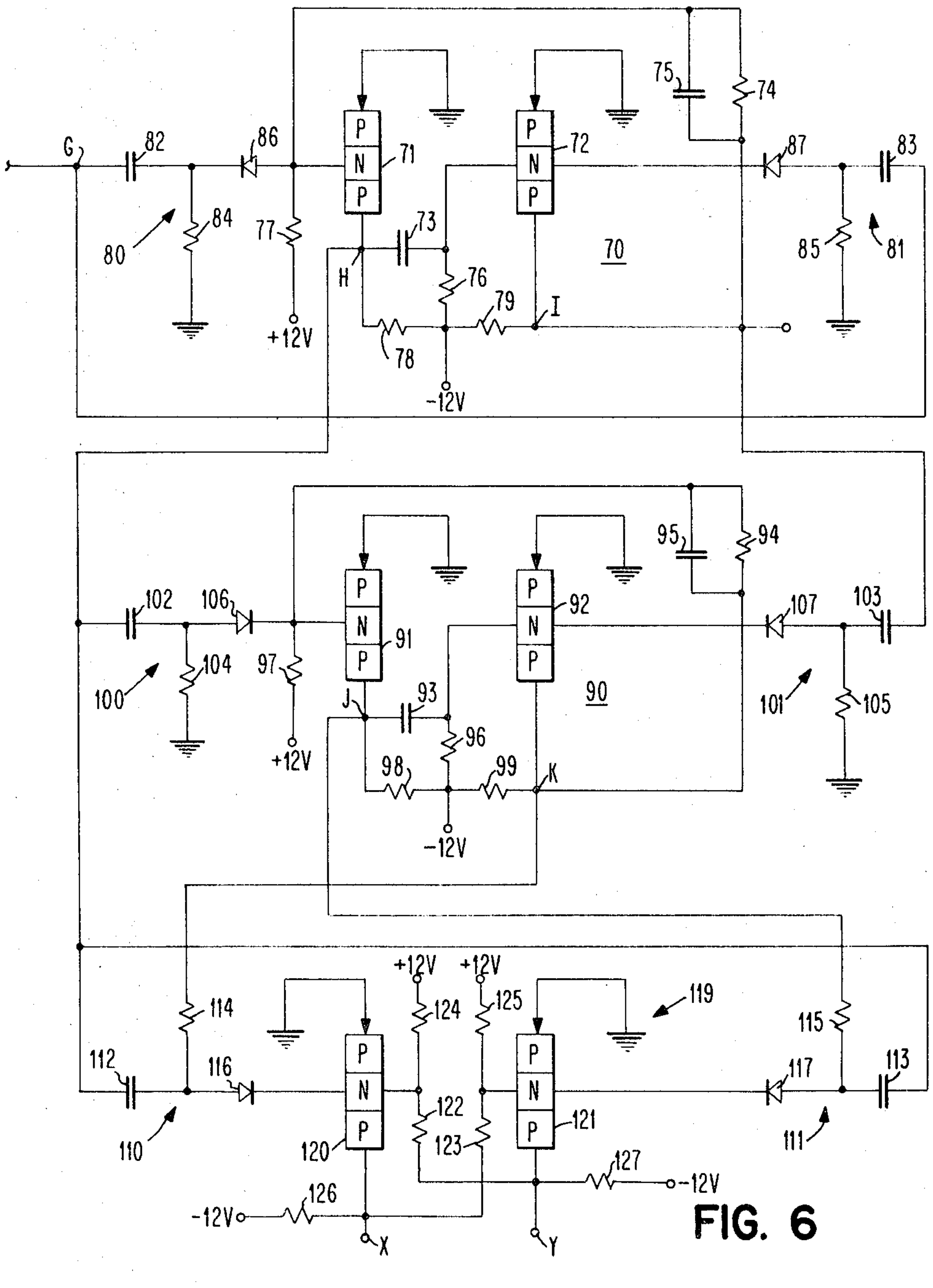
FIG. 6 is a schematic diagram illustrating one preferred implementation of the improved digital demodulator diagrammatically illustrated in FIG. 5.

FIG. 5 illustrates diagrammatically and FIG. 6 illustrates schematically a preferred embodiment in which a maximum data rate can be achieved. In this embodiment, it is possible to assign a half cycle of the higher frequency and a half cycle of the lower frequency for each data bit.

As in the embodiment set forth in FIG. 1, the frequency of a transmitter oscillator means 2 is controlled by a binary data source 1 to transmit data at one or the other of two frequencies over a transmission line 4 to a receiver including an amplifier-limiter 3. The output terminal G of the amplifier-limiter 3 is applied to a first monostable multivibrator 70. The output of the multivibrator 70 is applied to a second monostable multivibrator device 90 and to a sample circuit 109. The output of the sample circuit is applied to a bistable device 119.

The monostable device 70 produces an output pulse of predetermined time duration in response to each positive and each negative transient in the output signal at G. The time duration of this output pulse from the device 70 is less than the half cycle time of the higher frequency. Each output pulse from the device 70 causes the second monostable device 90 to produce an output pulse of predetermined time duration. The sum of the periods of these output timing pulses from the devices 70 and 90 is less than the half cycle time of the lower frequency and greater than the half cycle time of the higher frequency. The preferred period of the consecutive timing pulses is equal to one-fourth the sum of the periods of the higher and lower frequencies.

Coincident with the occurrence of each transient in the output of the amplifier-limiter 3, the sample circuit 109 determines the presence or absence of an output pulse from the device 90. The sample circuit 109 then forces the bistable device 119 to one stable state or the other depending upon the presence or absence of the timing pulse in the output of the multivibrator 90.

In the implementation of FIG. 6, the multivibrator 70 comprises a pair of grounded emitter transistor amplifiers 71 and 72. The collector electrode of the transistor 71 is coupled to the base electrode of the transistor 72 by way of a capacitor 73. The collector electrode of the transistor 72 is coupled to the base electrode of the transistor 71 by way of parallel-connected resistor 74 and capacitor 75. The base electrodes of the transistors 71 and 72 are biased respectively to their OFF and ON conditions by means including resistors 77 and 76. The collector output terminals H and I of the transistors 71 and 72 are returned to a negative supply by way of resistors 78 and 79 respectively.

The output terminal G from the amplifier-limiter 3 is coupled to the base electrodes of the transistors 71 and 72 by way of gate circuits 80 and 81. The gate circuit 80 includes a capacitor 82 and a diode 86 connected in series between the terminal G and the base electrode of the transistor 71. The junction between the capacitor and diode is connected to ground by way of a resistor 84.

The gate 81 includes a capacitor 83 and a diode 87 connected between the terminal G and the base electrode of the transistor 72. The junction between the capacitor and diode is connected to ground potential by way of a resistor 85.

The gates 80 and 81 are somewhat similar to a Harpur gate of the type described above. Each negative transient appearing at the terminal G (FIG. 7) will be coupled to the base electrode of the transistor 71 by way of the capacitor 82 and the diode 86 to switch the transistor 71 ON, which in turn causes the transistor 72 to turn OFF. Each positive transient appearing at the terminal G will be coupled to the base electrode of the transistor 72 by way of the capacitor 83 and the diode 87 to cause the transistor 72 to turn OFF, which in turn causes the transistor 71 to turn ON. Thus it can be seen that both positive and negative transients appearing at the terminal G cause the multivibrator 70 to be switched from its stable state to its unstable state. After a predetermined time interval determined essentially by the RC time constant of the capacitor 73 and resistor 76, the multivibrator 70 will return to its initial stable state.

The multivibrator 90 comprises a pair of transistors 91 and 92 connected in a grounded emitter configuration. The collector output terminal J of the transistor 91 is cross-coupled to the base electrode of the transistor 92 by way of a capacitor 93 and the collector output terminal K of the transistor 92 is cross-coupled to the base electrode of the transistor 91 by way of parallel-connected resistor 94 and capacitor 95. The transistor 92 is normally biased ON by means of the resistor 96 and the transistor 91 is normally biased to its OFF state by means including a resistor 97. The collector electrodes are connected to a negative supply terminal by way of resistors 98 and 99. The base electrodes of the transistors 91 and 92 are coupled to the output terminals H and I respectively of the multivibrator 70 by way of gate circuits 100 and 101.

The gate circuit 100 includes a capacitor 102 and a diode 106 connected in series between the terminal H and the base electrode of the transistor 91. A resistor 104 couples the junction between the capacitor and diode to ground potential. The gate circuit 101 includes a capacitor 103 and a diode 107 connected in series between the terminal I and the base electrode of the transistor 92. A resistor 105 couples the junction between the capacitor and diode to ground potential.

Figure 7:
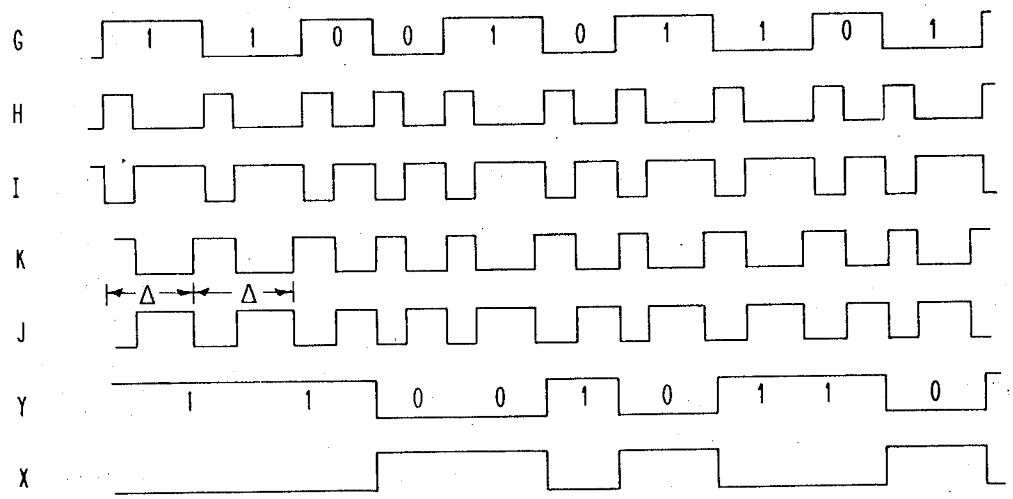
FIG. 7 shows waveforms illustrating the operation of the embodiment shown in FIG. 6.

With particular reference to the waveforms illustrated in FIG. 7, corresponding to data bits 1100101101, it will be seen that each positive transient at the terminal I of multivibrator 70 will turn OFF the normally conducting transistor 92 in a multivibrator 90 to cause the latter multivibrator to switch from its stable state to its unstable state. When signals are being received at the lower frequency, the multivibrator 90 will return to its stable state after a predetermined time interval determined essentially by the capacitor 93 and the resistor 96. However, when the higher frequency signals are being received a positive transient will be produced at the output terminal H before the multivibrator 90 has had time to restore normally to its stable state. This positive transient at the terminal H will be applied to the base electrode of the transistor 91 by way of the capacitor 102 and the diode 106 to turn the transistor 91 OFF, thereby permitting the transistor 92 to become energized again. Thus the positive transients at the terminal H not only sample the condition of the multivibrator 90 to determine whether the lower or higher frequency is being detected, but also restore the multivibrator 90 to its stable state when the higher frequency is being received.

The output terminals J and K of the multivibrator device 90 are coupled to the inputs of the bistable trigger 119 by way of gate circuits 110 and 111 of the sample circuit 109.

The gate circuit 110 comprises a capacitor 112 and a diode 116 connected in series between the output terminal H of the multivibrator 70 and the base electrode of a transistor 120 in the trigger 119. The gate circuit 110 also includes a resistor 114 which couples the output terminal K of the multivibrator 90 to the junction between the capacitor 112 of the diode 116.

The gate circuit 111 comprises a series capacitor 113 and diode 117 which couple the output terminal H of the multivibrator 70 to the base electrode of a transistor 121 in the trigger 119. The gate 111 also includes a resistor 115 which couples the output terminal J of the multivibrator 90 to the junction between the capacitor 113 and the diode 117.

The transistors 120 and 121 are suitably cross-coupled by means of resistors 122 and 123 to form the bistable device 119. The emitter electrodes of the transistors 120 and 121 are connected to ground potential. Their base electrodes are coupled to positive supplies by means of bias resistors 124 and 125. The collector output terminals X and Y of the transistors 120 and 121 are connected to negative operating potentials by way of resistors 126 and 127.

Each of the gate circuits 110 and 111 produces positive output pulses at their diodes 116 and 117 in response to the application of a positive transient at their capacitors 112 or 113 subsequent to the capacitor being precharged by means of ground potential being applied to the resistors 114 or 115 respectively. The capacitors 112 and 113 have the same input signal source; that is, the output terminal H of the multivibrator 70.

Thus, positive transients occurring at the output terminal H of the multivibrator 70 sample the output terminals J and K of the multivibrator 90 to determine which one is at the relatively positive level. If the output terminal J is at the positive level, the gate 111 will apply a positive pulse to the base electrode of the transistor 121 to force it to its OFF state if it is conducting at the time. Similarly, if the output terminal K of the multivibrator 90 is relatively positive when the positive transient occurs at the output terminal H of the multivibrator 70, the gate 110 will apply a positive pulse to the base electrode of the transistor 120 to force the transistor to its OFF state in the event that it is conducting.

With the transistor 120 conducting, the output terminals X and Y of the trigger 119 will be at their relatively positive and negative levels respectively. Alternatively, when the transistor 121 is conducting, the output terminals of X and Y will be at their relative negative and positive levels respectively.

With particular reference to the waveforms of FIG. 7, it can be seen that each positive transient at the terminal H occurs simultaneously with a positive or negative transient in the input signal G. At the end of each pulse produced by the multivibrator 70, the positive transient at its output terminal I applies a pulse to the multivibrator 90 by way of the gate circuit 101 to force the multivibrator 90 to its unstable state in which the output terminal K is at its relatively negative level and its output terminal J is at its relatively positive level. The next succeeding positive transient at the output terminal H samples the output terminals K and J to determine which of the two is at its relatively positive level.

As seen in FIG. 7, if the low frequency is being received, the multivibrator 90 will have reset to its stable state in which the output terminal K is already positive and the output terminal J is negative. With these conditions existing, the positive transient at the terminal H applies a positive pulse to the transistor 120 of the trigger 119 by way of the gate circuit 110 to force the transistor 120 OFF if in fact it is conducting. This produces a positive level at the output terminal Y and a negative level at the output terminal X.

If, on the other hand, the high frequency is being received, the subsequent positive transient at the output terminal H is initiated prior to reset of the multivibrator 90 to its stable state. As a result, this positive transient at H occurs when the terminal J is positive and the terminal K is negative. Under these conditions, the positive transient at the terminal H causes a positive pulse to be applied to the transistor 121 of the trigger 119 by way of the gate circuit 111 to force the transistor 121 to its OFF state if in fact it is conducting. With the transistor 121 OFF, the output terminals X and Y are at their positive and negative levels respectively.

It will be noted that the positive transients in the signal at the output terminal H occur coincident with each transient in the input signal G. Thus every transient in the signal at G initiates the sampling of the output of the multivibrator 90 to determine which of the two frequencies is being received. As a result, the frequency of each half cycle will be reliably detected by the circuit of FIG. 6.

Inasmuch as the transmitted data can be detected reliably within one half cycle time at either the high or low frequency, it is now feasible to transmit only one half cycle for each data bit for a maximum transmission rate.

In those systems wherein a local oscillator is utilized to determine the time for sampling a received data bit, a fixed period for each transmitted data bit is required, irrespective of its frequency. In such a system, it is possible with the circuit of FIG. 6 to establish a period equal to one-half the cycle time of the lower frequency for each data bit. In an environment where significant line distortion is anticipated, a data bit period equal to the cycle time of the lower frequency may be utilized to maintain errors at a minimum.

While the invention has been particularly shown and described with reference to preferred embodiments thereof, it will be understood by those skilled in the art that the foregoing and other changes in form and details may be made therein without departing from the spirit and scope of the invention.

I claim:

1. A frequency discriminator for detecting at which one of two frequencies data signals are received comprising means responsive to the data signals for producing electrical signal changes at the end of predetermined time intervals after each positive and each negative transient in the data signal, the duration of said time intervals being less than the half cycle time of the lower of the two frequencies and greater than the half cycle time of the higher of the two frequencies, a bistable device, and circuit means responsive to each half cycle of the data signals and to each electrical signal change for causing the bistable device to assume a condition representative of the momentary frequency of each half cycle of the data signal.

2. The discriminator of claim 1 wherein the duration of the time intervals is equal to the sum of one-fourth the cycle time of the lower frequency and one-fourth the cycle time of the higher frequency.

3. The discriminator of claim 1 wherein the received data signals are sinusoidal, said discriminator further comprising amplifier limiter means responsive to the sinusoidal signals for producing corresponding square wave signals of substantially the same phase and frequency, and means coupling said square wave signals to said electrical signal change producing means and to said circuit means to determine the frequency of the square wave signals.

4. The discriminator of claim 3 wherein said electrical signal change producing means includes a pair of monostable devices, each responsive to transients of a respective polarity for producing output pulses having a duration equal to that of said predetermined time intervals, said circuit means being responsive to the trailing edges of each monostable device output pulse and to the square wave signals to cause the bistable device to assume a condition corresponding to the momentary level of said square wave signal.

5. A digital discriminator for detecting at which one of two frequencies bivalued signals are received comprising means responsive to each positive transient in the bivalued signals for producing a signal condition which exists at a time interval after the transient equal to half the period of the higher frequency and which terminates prior to the time interval after the transient equal to half the period of the lower frequency, means responsive to each negative transient in the bivalued signals for producing a signal condition which exists at a time interval after the transient equal to half the period of the higher frequency and which terminates prior to the time interval after the transient equal to half the period of the lower frequency, a bistable device, and means effective coincident with each positive and negative transient for setting the bistable device in one or the other of its states depending upon the presence or absence of a respective one of said signal conditions.

6. A digital discriminator for detecting at which one of two frequencies sinusoidal data signals are received comprising, limiter means responsive to received sinusoidal signals for producing corresponding square wave signals of substantially the same frequency and phase, means responsive to each positive transient in the square wave signals for producing a signal condition which exists at a time interval after the transient equal to half the period of the higher frequency and which terminates prior to the time interval after the transient equal to half the period of the lower frequency, means responsive to each negative transient in the square wave signals for producing a signal condition which exists at a time interval after the transient equal to half the period of the higher frequency and which terminates prior to the time interval after the transient equal to half the period of the lower frequency, a bistable device, and means effective coincident with each positive and negative tranisent for setting the bistable device in one or the other of its states depending upon the presence or absence of a respective one of said signal conditions.

7. A discriminator for detecting at which one of two frequencies bivalued data signals are received comprising first means responsive to each positive transient in the bivalued data signals for producing first output pulses of a first predetermined time duration which is less than the half cycle time of the higher of the two frequencies, second means responsive to each negative transient in the bivalued data signals for producing second output pulses of said first predetermined time duration, third means responsive to the trailing edge of each first and second output pulse for producing third output pulses of a second predetermined time duration, the sum of the first and second predetermined time durations being less than the half cycle time of the lower of the two frequencies and greater than the half cycle time of the higher of the two frequencies, a bistable device having two stable conditions corresponding respectively to the higher and lower frequencies, and means responsive to the first, second and third output pulses for setting the bistable device in the stable state corresponding to the momentary frequency of the data signals.

8. A discriminator for detecting at which one of two frequencies bivalued data signals are received comprising a first monostable device means responsive to each positive and to each negative transient in the bivalued data signals for producing complemented first and second output pulses of a first predetermined time duration which is less than the half cycle time of the higher of the two frequencies, a second monostable device responsive to the trailing edge of each first output pulse for producing complemented third and fourth output pulses of a second predetermined time duration, the sum of the first and second predetermined time durations being less than the half cycle time of the lower of the two frequencies and greater than the half cycle time of the higher of the two frequencies, means responsive to the leading edge of each second output pulse for resetting the second monostable device to its stable state at the termination of each half cycle of the higher frequency bivalued signals, a bistable device having two stable conditions corresponding respectively to the higher and lower frequencies, and means responsive to the first, third and fourth output pulses for setting the bistable device in a stable state corresponding to the momentary frequency of the data signals.

9. The method of determining at which one of two different frequencies data signals, having positive and negative transients defining each half cycle, are being received comprising the steps of producing a sample pulse an instant in time after each positive and each negative transient, which instant occurs a time interval after each transient which is less than the half cycle time of the lower frequency and greater than the half cycle time of the high frequency, and producing one of two different electrical conditions depending upon whether or not the data signal half cycle, initiated with each transient, has terminated at each said instant in time.

References Cited

UNITED STATES PATENTS

| | | | |
|---|---|---|---|
| 3,233,181 | 2/1966 | Calfee | 329—128 |
| 3,409,833 | 11/1968 | Dalton | 329—104X |
| 3,412,205 | 11/1968 | Saeger | 178—66 |
| 3,421,088 | 1/1969 | Salley et al. | 178—66 |
| 3,437,932 | 4/1969 | Malakoff | 325—320 |
| 3,439,283 | 4/1969 | Danielson | 329—104 |
| 3,470,478 | 9/1969 | Crafts | 328—128X |

ALFRED L. BRODY, Primary Examiner

U.S. Cl. X.R.

178—66; 325—320; 329—102, 128